July 4, 1933.  A. H. RZEPPA  1,916,442
UNIVERSAL JOINT
Filed Aug. 21, 1929   3 Sheets-Sheet 3

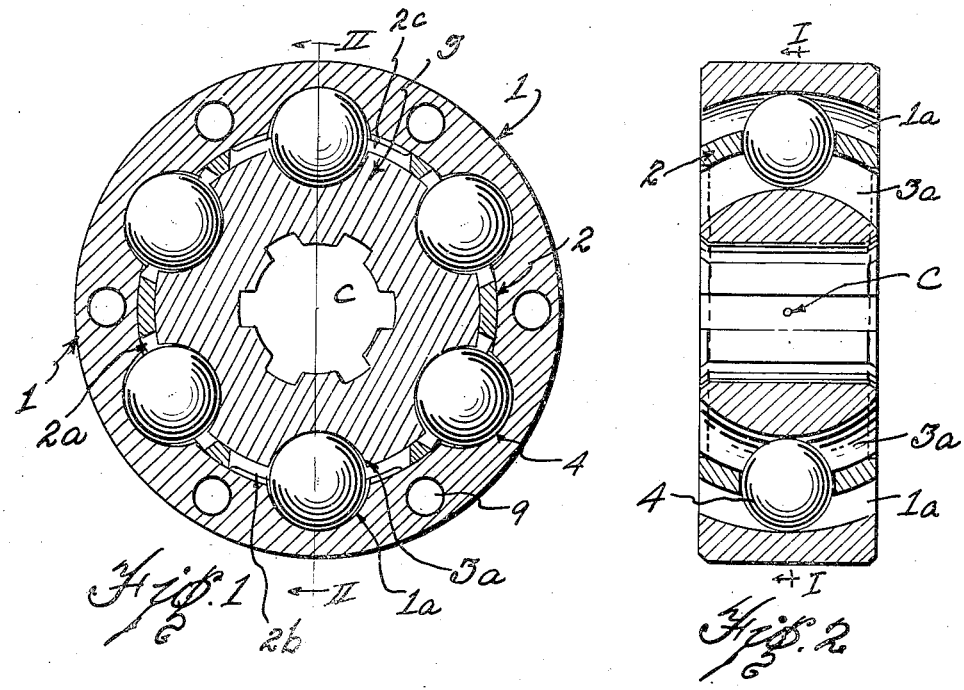
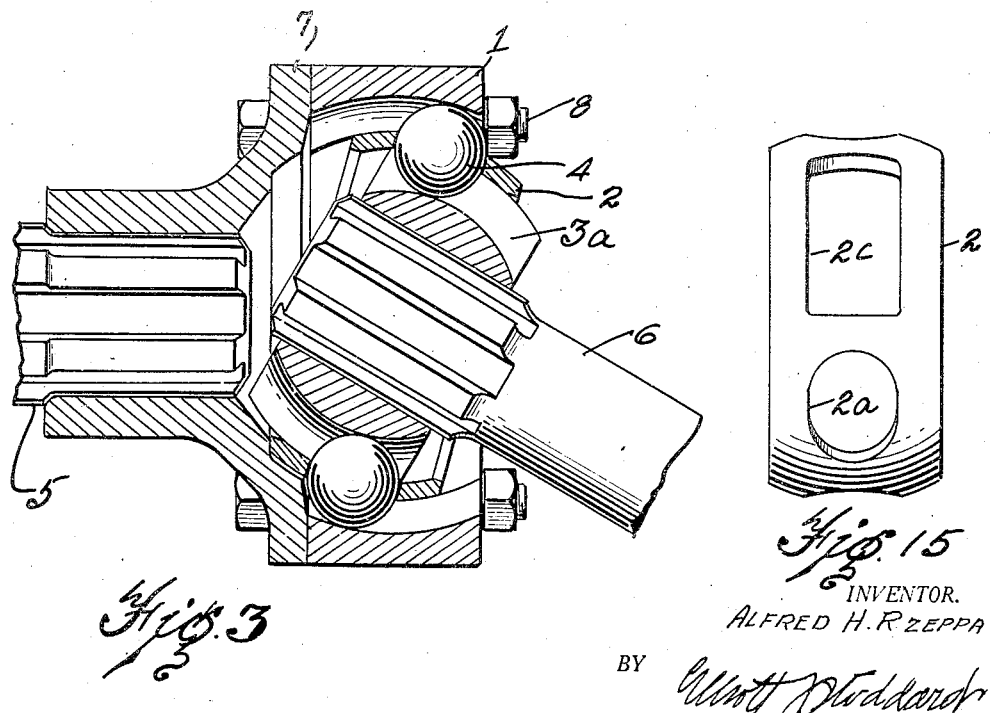
INVENTOR.
ALFRED H. RZEPPA
BY
ATTORNEY.

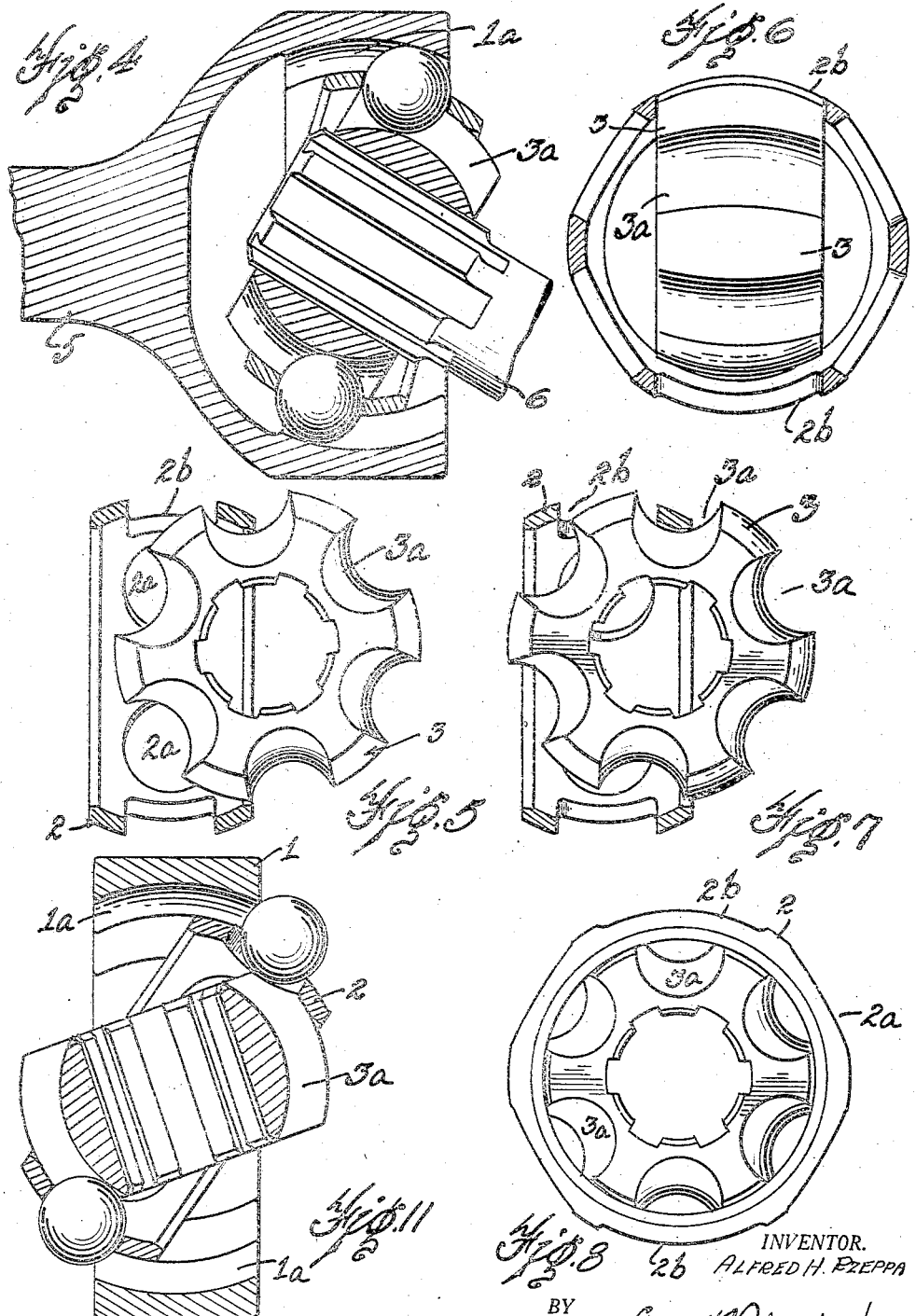

INVENTOR.
ALFRED H. RZEPPA
BY
ATTORNEY.

Patented July 4, 1933

1,916,442

UNITED STATES PATENT OFFICE

ALFRED H. RZEPPA, OF DETROIT, MICHIGAN

UNIVERSAL JOINT

Application filed August 21, 1929. Serial No. 387,516.

My invention relates to universal joints and an object of my improvements is to provide a construction adapted to transmit rotary motion between two shaft ends, not axially alined and in such a manner that the rate of angular velocity in the driving and driven members shall be the same and simultaneous and that no angular acceleration or deceleration of the driving shaft due to the universal joint action, shall occur at any driving angle, that may be marketed and applied as a special complete unit, or may be constructed as a part of an adjoining mechanical detail and one that has few and strong parts of simple integral form which may be economically made, yet with great accuracy, and which may be easily assembled into a self contained unit.

To this end I employ three members substantially shaped as rings, assembled one within the other and having mutual contacts through inner and outer bearing surfaces. These surfaces are essentially spherical zones having a common center, so that the assembled members may be likened to a ball within a second ball and the two within a third ball, the composite assembly being truncated by parallel planes on the opposite sides of the common center and possessing perfect freedom of relative rotation.

The torque is transmitted between the inner and outer members, through a number of balls free to roll in meridional grooves which are in the spherical bearing surfaces of the said two members and formed to receive said balls.

Its construction and use is hereinafter described, as shown in the accompanying drawings, in which:

Figure 1 is a sectional view, in the plane I—I Figure 2, of a construction embodying my invention.

Figure 2 is a section of the same on the line II—II, Figure 1.

Figure 3 is a view similar to Figure 2 showing the construction secured to shafts that are not alined, the parts, consequently, being in different positions from those of Figures 1 and 2.

Figure 4 is a view similar to Figure 3 showing a modified construction.

Figures 5 and 6 are views, partly in section in planes at right angles to each other, of the two inner members, illustrating the method of assembling the same.

Figure 7 is a view similar to Figure 5 showing the parts in a different relative position.

Figure 8 is a face view of the assembled ring 2 and member 3 and in normal relative position.

Figure 11 is a sectional view illustrating the method of placing the balls in the groove.

Figure 12:
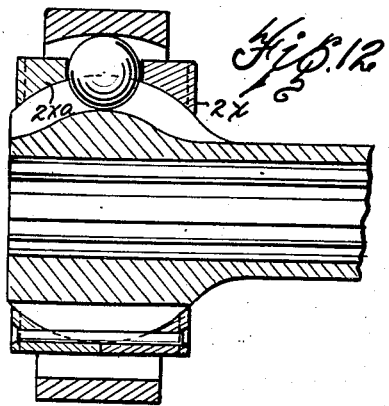
Figures 12 and 13 are sectional views at right angles to each other, showing a modified construction.
Figure 13:
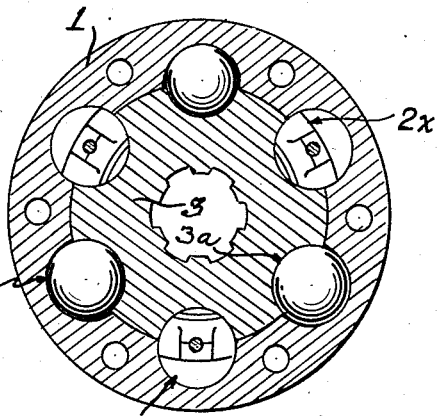
Figure 14:
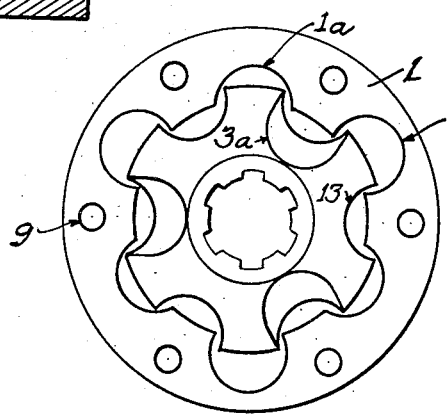

Figure 14 is a face view of the modification of Figures 12 and 13 to a smaller scale, with the parts 1 and 3 in position to be assembled by axial movement, the cage being omitted.

Figure 15 is an elevation of the ball cage of the form first above described.

Modifications of details, as shown in these drawings, which do not influence the essential constructive and working features of this universal joint are understood to be within the scope of this invention, but it is not proposed to follow these drawings in every case, but it is suggested that such details shall be governed by the requirement of each special application.

1 is the outer member. This is adapted to be secured to a shaft end 5 by means of a flange 7 and held in place by bolts 8 passing into apertures 9, or in any suitable manner. It may be also arranged as an integral portion of the shafting or shaft receiving flange, or socket, as the case may be, as indicated in Figure 4.

The ring 1 has its interior surface formed to the surface of a spherical zone, the edges of which are in two parallel planes which are symmetrically located upon opposite sides of the sphere center C and form the sides of said member.

The inner member 3 is a thick ring, having its outer surface formed to a spherical zone limited by two parallel planes symmetrically located upon opposite sides of the sphere center C. This member is provided at its center with a socket and keyways passing axially through it to receive a fitted and keyed shaft end 6.

The intermediate member 2 is a ring having inner and outer surfaces formed to concentric spherical zones with side edges in two parallel planes which are symmetrically located upon opposite sides of the sphere center C.

All of the above described zonal surfaces have a common center at C.

The outer surfaces of 2 fits and bears against the inner surfaces of the outer member 1 and the inner surfaces of 2 fits and bears against the outer surfaces of the inner member 3.

Ball grooves 3a are disposed in great circle arcs having the common center C and in planes at right angles to the zonal side surfaces and cut at equal angular distances from each other into the outer surface of the inner member 3 and the same number of similar grooves disposed in like manner are cut in the inner surface of the outer member 1. When assembled and in normal position these two sets of grooves register in pairs, the inner and outer grooves radially opposite each other and parallel, in such fashion that the surfaces of each pair form a ball receiving sector of an annulus.

The intermediate member 2 is fitted between the inner and outer members 1 and 3 and provided with oblong apertures 2a and 2b extending radially through it at equal spaced angular intervals so as to register with the grooves 1a and 3a. The centers of these apertures are positioned in a plane midway between and parallel to the zonal planes. The number of apertures equals the number of groove pairs.

The opposite apertures 2b, 2b are made of slightly greater length than the distance between the zonal planes of the parts 1 and 3.

4 are balls of a size to approximately fit the groove pairs 1a—3a. These balls are held individually in apertures 2a—2b of the member, or cage 2, and also engage in the grooves 1a—3a locking the inner and outer members together so that torque may be communicated from one to the other at a minimum of friction, because of their rolling action, when shafts 5 and 6 are not in axial alinement but include a driving angle, while the balls are held in their approximate relative position and in the same plane by the intermediate member 2.

The cage 2 is positioned by a plurality of balls in one plane that passes through the center C at an angle between that of the shaft portions 5 and 6, thus securing constant velocity transmission of rotation.

The axes of the shafts will always intersect at the common spherical center C, due to the spherical concentric bearings of members 1, 2 and 3.

The number and size of the grooves and the balls therein are basically unrestricted, except by considerations of strength and adaptability of the members 1, 2 and 3 to be assembled, one within the other, as hereinafter described. Said number may be taken between 3 and 8 for practical purposes. However, 6 is recommended as the best practice for the average construction. The thickness of the parts between the zonal planes should not much exceed that shown in the drawings, so that the parts may be assembled.

The number and size of the grooves are such that the external projections, or tooth portions, between adjacent grooves of the inner member 3 shall form projections or teeth having a width between the grooves less than the diameter of the balls.

The width of all cage apertures is slightly in excess of the ball diameter.

In the modification of Figures 12 and 13 I have shown a construction in which there are only three ball-containing pairs of grooves. In such a case as this it is necessary to form grooves between the ball containing grooves for the purpose of assembling, as hereinafter described. This intermediate groove may be formed straight across and need not be in the arc of a circle.

The distance in a zonal plane between two diametrically opposite teeth of the outer member is greater than the shortest distance between the outer surface of the cage 2 at the edge of two diametrically opposite apertures for the purpose of assembling, as hereinafter described.

The method of assembling is as follows:

The inner member 3 is first inserted into the ball cage 2 by turning it into a plane at right angles with that of the cage and passing a projecting tooth of said inner member into one of the apertures 2b, while the edge of the cage 2 lies within one of the grooves 3a of the inner member 3, as illustrated in Figures 5, 6 and 7. The inner member 3 is moved to a position within the cage at which the centers of both members coincide. It is then rotated about its axis into the same plane as the cage and when grooves and apertures register it is then in operative position, as shown in Figures 2 and 8.

Figure 9:
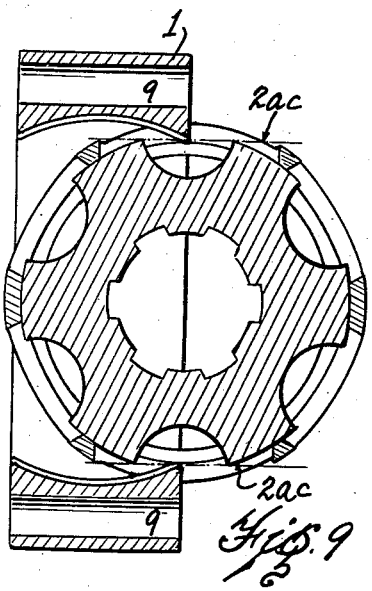
Figure 9 is a sectional view illustrating the method of assembling the two inner parts into the outer part.
Figure 10:
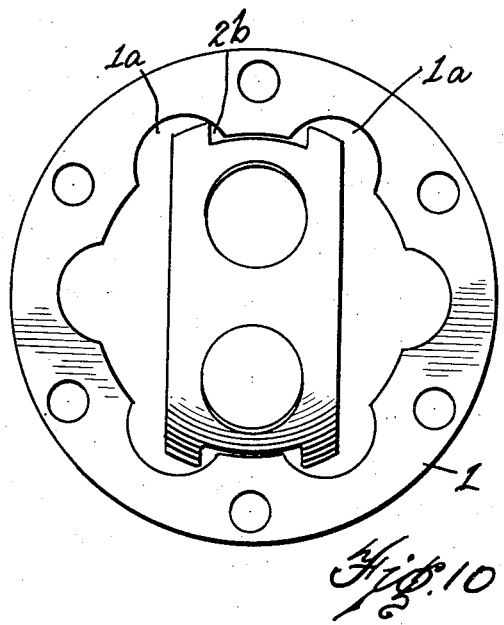
Figure 10 is an elevation looking from the right of Figure 9.

The inner member 3 and cage 2, engaged as just described, will then be inserted into the outer member 1. A projecting tooth of the outer member between adjacent grooves 1a enters a cage aperture 2b, as illustrated in Figures 9 and 10, the engaging parts being in planes at right angles to each other and when moved to a position where the centers of all members coincide the inner member and ring may be turned into the same plane as the outer member to complete the engagement and all grooves and apertures will then register in operative position.

The balls 4 are then best inserted in place by tilting the cage into angular position with respect to the outer member and tilting the inner member to a position of twice this angularity, as shown in Figure 11. The balls may then be inserted in pairs into oppositely disposed cage apertures and grooves in the inner member 3 and then the cage 2 and inner member 3 may be turned back to their normal position in the same plane as the outer member. This process is repeated until all the balls have been assembled.

In the modification shown in Figures 12 and 13 I show the zonal surface of the inner member 3 directly engaging the inner zonal surface of the member 1, omitting the interposed member 2. Between the pairs of grooves 1a—3a I have interposed grooves 13 passing directly in a straight line through the parts from side to side and partly in each member. A ball cage 2x having rings at both sides of members 1 and 3 has connecting members passing through the apertures 13 and projections 2xa extending into the apertures 1a and 3a to hold the balls in position, as shown in Figure 12.

To assemble the parts 1 and 3 in the last described form, the part 3 is placed coaxially with the part 1 and turned about its axis until the teeth, or projections, between adjacent grooves come opposite the grooves 1a, as shown in Figure 14, and the part 3 is then moved axially into position within the part 1. The projection between its adjacent grooves 3a passing into grooves 1a and 13 until the centers of the two parts coincide. They are then turned relatively until the grooves 1a and 3a register with each other, as shown in Figure 13.

The above described parts when assembled constitute a unitary universal joint whose bearing surfaces mutually contact each other in concentric spherical zones.

The parts may be heat-treated and ground by conventional methods and the parts cheaply and accurately made.

What I claim is:

1. A universal joint consisting of a plurality of integral members having mutual contacting surfaces that are zones of concentric spheres with their edges in zonal planes upon opposite sides of the common center and at a distance apart approximately that required for the proper engagement and the angular motion of the shafts to be united by said joint, the outer and inner members having ball grooves across their adjacent zonal surfaces in arcs of circles with said common center and an intermediate member forming a ball cage, said member having outer and inner zonal surfaces shaped to and contacting respectively with the inner surface of the outer member and the outer surface of the inner member, said intermediate member having diametrically opposite apertures therethrough, the shortest distance between the outer surface of said intermediate member at the edges of diametrically opposed apertures being less than the distance in the zonal plane between two diametrically opposite teeth of the outer member, to permit the insertion of the intermediate member at right angles into the outer member.

2. A universal joint consisting of a plurality of integral members having contacting surfaces that are zones of concentric spheres with their edges in limiting planes upon opposite sides of the common center and at a distance apart approximately that required by the angular motion of the shafts to be united by said joint and for proper engagement of said members, the outer and inner members having ball grooves across their adjacent zonal surfaces in arcs of circles with said common center and an intermediate member, said intermediate member being provided with diametrically opposite apertures therethrough, the shortest distance between the outer surface of said intermediate member at the edges of diametrically opposed apertures being smaller than the distance in a zonal plane between the two diametrically opposite teeth of the outer member.

In testimony whereof, I sign this specification.

ALFRED H. RZEPPA.